United States Patent [19]

Schmitt et al.

[11] Patent Number: 5,316,749

[45] Date of Patent: May 31, 1994

[54] PROCESS FOR FORMING AMMONIUM DINITRAMIDE SALT BY REACTION BETWEEN AMMONIA AND A NITRONIUM-CONTAINING COMPOUND

[75] Inventors: Robert J. Schmitt, Redwood City; Jeffrey C. Bottaro, Mountain View; Paul E. Penwell, Menlo Park; David C. Bomberger, Belmont, all of Calif.

[73] Assignee: SRI International, Menlo Park, Calif.

[21] Appl. No.: 737,757

[22] Filed: Jul. 30, 1991

[51] Int. Cl.$^5$ .............................................. C01B 21/20
[52] U.S. Cl. ...................................................... 423/385
[58] Field of Search .......................................... 423/385

[56] References Cited

U.S. PATENT DOCUMENTS

| | | | |
|---|---|---|---|
| 3,428,667 | 2/1969 | Hamel et al. | 260/467 |
| 3,520,742 | 7/1970 | Witz | 423/385 |
| 4,216,191 | 8/1980 | Klemann et al. | 423/385 |
| 4,878,968 | 11/1989 | Willer et al. | 149/45 |
| 5,198,204 | 3/1993 | Bottaro et al. | 423/385 |
| 5,254,324 | 10/1993 | Bottaro et al. | 423/385 |

OTHER PUBLICATIONS

Barbes, Henri, et al., "Relation Between Nitration Capacity and Structure of NO$_2$+ in Some Nitryl Salts", *Revue de Chemie Minerale*, vol. 8, No. 6, 1971, pp. 851–858.

Leroy, Georges, et al., "A Theoretical Investigation of the Structure and Reactivity of Nitrogen-Centered Radicals", *Journal of Molecular Structure (Theochem)*, vol. 153, 1987, Table 6.

Tellier-Pollon, Sylvaine, et al., "Inorganic Preparation of Nitramide", *Revue de Chemie Minerale*, vol. 4, No. 2, 1967, pp. 413–423.

"Third Quarterly Report: Basic Research in Solid Oxygen Oxidizers", Government Contract AF 04(611)-8549, Dec., 1963, pp. 6–7.

Vast, Pierre, et al., "Reaction Between Nitric Anhydride and Ammonia at Low Temperature, Characterization of Nitramide", *Compt. Rend.*, vol. 260, No. 22, (Groupe 8), 1965, pp. 5799–5801.

Vast, Pierre, et al., "Reactions Between Liquid Ammonia and Some Nitryl Salts", *C. R. Acad. Sci. Paris*, Ser. C264 (21), 1967, pp. 1697–1699.

*Primary Examiner*—Wayne Langel
*Attorney, Agent, or Firm*—John P. Taylor

[57] ABSTRACT

A method for forming an ionically bonded ammonium dinitramide salt having the formula NH$_4{}^3$ON(NO$_2$)$_2$— useful as a stable oxidizer for solid fuel rocket propellant or explosive formulations is disclosed. The ammonium dinitramide salt is formed by the reaction of ammonia and a nitronium-containing compound, such as a nitronium salt or a covalently bonded compound containing a NO$_2$— group, at a temperature of from about $-20°$ C. to about $-120°$ C. The nitronium-containing compound may be either a covalently bonded compound containing a NO$_2$— group or a nitronium salt having the formula (NO$_2{}^+$)$_n$X$^{-n}$, where X is the anion of the nitronium salt and n=1-2.

26 Claims, 1 Drawing Sheet

---

PROVIDING A NITRONIUM-CONTAINING COMPOUND REACTANT IN A FORM SUITABLE FOR REACTION WITH AMMONIA

↓

REACTING SAID NITRONIUM-CONTAINING COMPOUND AND AMMONIA TOGETHER AT A TEMPERATURE OF FROM ABOUT -120°C TO ABOUT -20°C FOR ABOUT 0.5-8 HOURS

↓

RECOVERING AN IONICALLY BONDED AMMONIUM DINITRAMIDE SALT PRODUCT FROM THE REACTION MASS

```
┌─────────────────────────────────────────┐
│   PROVIDING A NITRONIUM-CONTAINING      │
│      COMPOUND REACTANT IN A FORM        │
│   SUITABLE FOR REACTION WITH AMMONIA    │
└─────────────────────────────────────────┘
                    │
┌─────────────────────────────────────────┐
│   REACTING SAID NITRONIUM-CONTAINING    │
│   COMPOUND AND AMMONIA TOGETHER AT A    │
│   TEMPERATURE OF FROM ABOUT -120°C TO   │
│    ABOUT -20°C FOR ABOUT 0.5-8 HOURS    │
└─────────────────────────────────────────┘
                    │
┌─────────────────────────────────────────┐
│    RECOVERING AN IONICALLY BONDED       │
│         AMMONIUM DINITRAMIDE SALT       │
│      PRODUCT FROM THE REACTION MASS     │
└─────────────────────────────────────────┘
```

PROCESS FOR FORMING AMMONIUM DINITRAMIDE SALT BY REACTION BETWEEN AMMONIA AND A NITRONIUM-CONTAINING COMPOUND

GOVERNMENT RIGHTS

This invention was made under government contracts N00014-86-C-0699 and N00014-88-C-0537 of the Office of Naval Research; and the government of the United States, therefore, has rights in this invention.

BACKGROUND OF THE INVENTION

1. Field of the Invention

This invention relates to a process for directly forming an ammonium dinitramide salt by reaction of ammonia and a nitronium-containing compound such as a nitronium salt.

2. Description of the Related Art

Solid oxidizers, such as ammonium perchlorate or potassium perchlorate, have been used in the past in rocket propellant formulation because of their improved ease of storage over liquid oxidizers. However, the presence of a halogen in the solid oxidant produces a visually observable smoke trail which is also observable on radar as well. Also, chlorine poses a serious atmospheric environmental hazard of ozone depletion and acid rain.

Because of such shortcomings in the use of perchlorate solid fuel oxidizers, other materials, including nitrate ($NO_3-$) compounds, have been investigated in the search for oxidizers which would provide the desired energy density and stability, without the drawbacks of the perchlorate oxidants.

In related U.S. Pat. application Ser. No. b 07/540,020, filed by several of us on Jun. 8, 1990 and assigned to the assignee of this invention and cross-reference to which is hereby made, we disclosed and claimed new ionically bound compounds suitable for use as oxidizers in rocket propellants. These compounds comprise dinitramide salts of metals or nitrogen-containing cations. We also described and claimed in that application a method of making such nitramide salts by first forming a dinitramine compound and then reacting the dinitramine compound with either a nitrogen-containing compound or a metal salt.

In related U.S. Pat. application Ser. No. 07/539,647, also filed by several of us on Jun. 18, 1990 and assigned to the assignee of this invention and cross-reference to which is hereby made, we disclosed and claimed another method of forming the dinitramide salts of metals or nitrogen-containing cations claimed in Ser. No. 07/540,020. This second method of making such nitramide salts comprises nitrating a carbamate to form a dinitramide acid intermediate product, followed by neutralizing the intermediate product with a compound selected from the class consisting of ammonia, hydrazine, a primary amine, a secondary amine, and a salt having the formula AX where A is a metal ion or a nitrogen-containing ion and X is a fluoride, chloride, hydroxyl, carbonate, alkoxide, or carboxyl anion.

The reaction of ammonia with nitronium salts at a temperature of about $-196°$ C. to form nitramide ($NH_2NO_2$), a covalently bonded compound, has also been reported in the literature. Vast et al., in *Chemical Abstracts* of a publication entitled "Reaction between nitric anhydride and ammonia at low temperature. Characterization of nitramide", published in Compt. Rend. 260 (22) (Groupe 8), pp. 5799-5801 (1965), report that the reaction $N_2O_5 + 2NH_3 \rightarrow NH_4NO_3 + NO_2NH_2$ was moderated by a suitable experimental device. Quantities of up to 5 g. of $NO_2NH_2$ were obtained with yields of 25-30%, based on $N_2O_5$. Small fractions of $N_2O_5$ (200-300 mg.) cooled to $-196°$ C. were introduced into partially crystallized ammonia under dry nitrogen. The operation lasted 15-30 minutes.

Traces of $N_2O_4$ were removed with $O_3$. The nitramide was recovered by extraction of the product with ether and precipitated with petroleum ether or isopentane.

Tellier-Pollon et al., in *Chemical Abstracts* of a publication entitled "Inorganic preparation of nitramide", published in Revue de Chemie minerale, 4(2), pp. 413-423 (1967), state that the reaction of $HNO_3$ with $NaSO_3NH_2$ to give $NO_2NH_2$ was investigated. The optimum conditions included use of 95% $HNO_3$, a sulfamate:acid ratio of 1:10-6 (sic), a contact time of 10-60 minutes, and a temperature of $-20$ to $-50°$ C. Addition of $NaNO_3$ to the reaction medium increased the yield of $NO_2NH_2$. Thus, a mixture of 10 ml. 95% $HNO_3$, 1.7 g. $NaNO_3$, and 1.2 g. $NaSO_3NH_2$ at $-35°$ C. gave 70% $NO_2NH_2$. Various methods of dilution, neutralization, and extraction were discussed. Best results were obtained by neutralization with $NAHCO_3$ solution.

Vast et al., in *Chemical Abstracts* of a publication entitled "Reactions between liquid ammonia and some nitryl salts", published in C.R. Acad. Sci. Paris, Ser. C264(21) pp. 1697-1699(1967), state that the reaction between 7 nitryl salts, including $N_2O_5$, $NO_2BF_4$, $NO_2ClO_4$, $NO_2FSO_3$, $NO_2Cl \cdot 2SO_3$, and $NO_2Cl$ with liquid $NH_3$ at low temperature was investigated. The nitryl salt at $-196°$ C. was added to liquid $NH_3$, the mixture was stirred at 400-1200 rpm., and the $NO_2NH_2$ was extracted and determined potentiometrically. $NO_2NH_2$ was obtained from all the salts except $NO_2Cl$. The ionization of the nitryl salt into an anion and $NO_2^+$ decreases in the order $NO_2NO_3 > NO_2BF_4 > NO_2ClO_4 > NO_2FSO_3$, $> (NO_2)_2S_2O_7 > NO_2S_2O_6Cl > NO_2Cl$. The decrease is related to the more or less ionic structure of the nitryl salts.

Barbes et al., in "Relation between nitration capacity and structure of $NO_2^+$ in some nitryl salts", published in Revue de Chemie Minerale, 1971 8(6), pp. 851-858, state that Raman and ir spectra of compounds $NO_2X$ show that the angle of O—N—O varies with X; increasing in the order $NO_2Cl < NO_2OH < NO_2NO_3$ (covalent) $< NO_2F < NO_2SO_3F < NO_2S_2O_6F < NO_2ClO_4 < NO_2BF_4 < NO_2NO_3$ (ionic). The order of nitrating power in the reactions: $NO_2X + 2NH_3 \rightarrow NO_2NH_2 + NH_4X$ and $NO_2X + Cl_2O \rightarrow NO_3Cl + ClX$ is also $NO_2SO_3F < NO_2ClO_4 < NO_2BF_4 < N_2O_5(s)$. These results indicate the degree of covalency in the $NO_2$—X bond. Similar relations are found between the reactivities of NOX compounds.

It is also know to react a nitronium salt with an organic nitramine to form a covalently bonded N,N-dinitramine compound. Hamel et al. U.S Pat. No. 3,428,667 describes the reaction of an ionic nitronium salt with a primary organic nitramine to form N,N-dinitramines having the general formula $R-[N(NO_2)_2]_n$ where n is 1-2 and R is a monovalent or divalent organic radical. These compounds are said to be highly energetic and useful as ingredients in propellant, explosive, and pyrotechnic compositions.

However, as discussed in our related applications, the formation and use of covalently bonded nitrogen-containing solid fuel oxidizing agents for use in rocket propellant formulations is not as desirable as the use of the previously claimed dinitramide salts because these salts have been found to be much more stable. The processes for forming such stable dinitramide salts in the aforementioned U.S. Pat. application Ser. Nos. 07/540,020 and 07/539,647 have been multiple step processes involving the formation of precursors which must then be isolated or recovered for a further reaction with another reactant to form the desired ionically bonded dinitramide salt product. It would be desirable to provide a simplified process to form an ionically bonded stable ammonium dinitramide salt wherein one reaction vessel may be used to form the ammonium dinitramide salt product.

SUMMARY OF THE INVENTION

It is, therefore, an object of this invention to provide a simplified process for the formation of an ammonium dinitramide salt by the reaction of ammonia and a nitronium-containing compound, such as a salt or a covalently bonded compound, at a temperature which will result in the formation of the ionically bonded ammonium dinitramide salt.

More particularly, it is an object of the invention to provide a process for forming ammonium dinitramide salt by the reaction of ammonia and a nitronium-containing compound at a temperature which ranges from about $-20°$ C. to about $-120°$ C., preferably from about $-30°$ C. to about $-90°$ C., and most preferably from about $-40°$ C. to about $-80°$ C.

These and other objects of the invention will be apparent from the following description and accompanying flow sheet.

BRIEF DESCRIPTION OF THE DRAWING

The sole drawing is a flowsheet illustrating the process of the invention.

DETAILED DESCRIPTION OF THE INVENTION

The invention comprises a simplified method of forming an ammonium dinitramide salt having the formula $NH_4^+N(NO_2)_2^-$ useful as a stable oxidizer for solid fuel rocket propellant or explosive formulations. The ionically bonded ammonium dinitramide salt is formed by the reaction of ammonia and a nitronium-containing compound, such as a nitronium salt or a covalently bonded compound containing a $NO_2$—group, at a temperature which ranges from about $-20°$ C. to about $-120°$ C., preferably ranges from about $-30°$ C. to about $-90°$ C., and most preferably ranging from about $-40°$ C. to about $-80°$ C. It is, important that the reaction temperature not be lower than about $-120°$ C. because the prior art reaction to form the covalently bonded and less stable nitramide ($NH_2NO_2$) may be more favored at a temperature which is lower than about $-120°$ C.

a. The Nitronium-Containing Compound

By use of the term "nitronium-containing compound" is meant either a covalently bonded compound containing a $NO_2$— group such as, for example, covalent $N_2O_5$ ($NO_2NO_3$) or trifluoroacetylnitrate, or a nitronium salt having the formula $(NO_2^+)_nX^{-n}$, where X is the anion of the nitronium salt and $n=1-2$. Examples of anions of nitronium salts which may be reacted with ammonia to form the desired dinitramide salts include $BF_4^-$, $NO_3^-$, $HS_2O_7^-$, $AlCl_4^-$, $F^-$, $PF_6^-$, $ClS_2O_6^-$, $F_2PO_2^-$, $AsF_6^-$, $SbF_6^-$, $FS_2O_6^-$, $ClO_4^-$, $S_2O_7^{-2}$, $SiF_6^{-2}$, and $SO_3F^-$.

As will be discussed below, the nitronium-containing compound is preferably formed, dissolved, dispersed, or mixed in a liquid prior to introduction into the reaction chamber, or formed in the chamber. If the particular nitronium-containing compound is soluble in the particular liquid used, the particle size of the nitronium-containing compound is, of course irrelevant. However, if a dispersion or mixture is to be formed, the size of the nitronium-containing compound may vary from as small as colloidal to as large as 1000 microns or higher. However, it will be understood that larger surface areas, i.e., smaller particles sizes, are the most desirable to facilitate reaction between the ammonia in solution and the nitronium-containing reactant.

If the nitronium-containing compound is used in the reaction in solid form, i.e., not in a liquid as a solution, dispersion, or mixture, as will be discussed in the alternate embodiment below, the particle size of the nitronium-containing compound should preferably range from about 50 Angstroms to about 1000 microns.

The content of $NO^+$, NO, and/or $NO_2$, or any other impurity in the nitronium-containing compound should not collectively exceed more than 10 wt.% of the total weight of the nitronium-containing compound. The presence of these particular oxides of nitrogen may interfere with the reaction, resulting in a reduced yield and a possible increase in side products. Therefore, the reactants used in the process of the invention should be made or purified to provide a total content of $NO^+$, NO, and/or $NO_2$ of less than 10 wt.%.

b. Solution/Dispersion/Mixture formed with Aprotic Liquid

In the preferred embodiment of the process, the first step is to form a solution, dispersion, or mixture of the nitronium-containing compound in a non-reactive aprotic liquid or solvent, i.e., a liquid that does not yield or accept a proton. The purpose of forming such a solution, dispersion, or mixture of the nitronium-containing compound, which will normally be in solid form, with the aprotic liquid, is to facilitate contact between the ammonia reactant dissolved in the aprotic solvent and the solid nitronium-containing reactant, i.e., the aprotic liquid does not enter into the reaction.

The aprotic liquid or solvent must be capable of existing in the liquid state at the temperature and pressure used in the reaction between ammonia and the nitronium-containing compound. Examples of aprotic liquids which may be used in the process of the invention include methylene chloride ($CH_2Cl_2$), chloroform ($CHCl_3$), carbon tetrachloride ($CCl_4$), methyl ether (($CH_3)_2O$), any freon gas (including fluorocarbons and chlorofluorocarbons), acetonitrile, ethyl acetate, ethyl ether, tetrahydrofuran, sulfolane, or mixtures of same.

The nitronium-containing compound is dissolved, dispersed, or merely added to the aprotic liquid in an amount ranging from about 1 to about 50 wt.% of the total weight of the resulting solution, dispersion, or mixture of the nitronium-containing compound and aprotic liquid, and preferably in an amount ranging from about 10 to about 25 wt.% of the resulting solution, dispersion, or mixture.

c. Reaction Conditions

The reaction between ammonia and the nitronium-containing compound is carried out at a temperature of from about −20° C. to about −120° C., preferably from about −30° C. to about −90° C., and most preferably from about −40° C. to about −80° C.

As stated above, it has been reported in the literature that ammonia can be reacted with a nitronium salt at −196° C. to form nitramide, a covalently bonded nitramide compound. Since such covalently bonded nitramide compounds are not as stable as the ionically bonded dinitramide salt, the presence of such nitramide compounds in the product must be avoided.

While we do not wish to be bound by any theories as to how the ammonium dinitramide salt is formed by the process of the invention, it is believed that by not lowering the reaction temperature to less than about −120° C., any covalently bonded nitramide compound which may form will be unstable and will further react with the nitronium-containing reactant, in the presence of the ammonia reactant, to form the desired ammonium dinitramide salt product.

From a standpoint of economics, of course, use of higher temperatures within the stated ranges will be most desirable anyway. In some instances, the lower end of the temperature range will be determined by the freezing temperature of the solution, dispersion, or mixture of the aprotic liquid and the nitronium-containing compound.

The pressure in the reactor during the reaction between ammonia and the nitronium-containing compound may range from slightly lower than atmospheric, i.e., about 700 Torr to slightly above atmospheric, i.e., about 800 Torr, but will typically be at about atmospheric pressure.

The reaction should be carried out under anhydrous conditions which may normally be provided by providing a blanket of inert or non-reactive gas such as argon or nitrogen. The use of oxygen or dry air may also be acceptable, but is not preferred.

The reaction is preferably carried out while mechanically stirring the liquid in the reaction vessel sufficiently to avoid any settling (when the nitronium compound is not dissolved) so that the nitrating agent, i.e., the nitronium-containing compound, is always exposed to the ammonia reactant in solution, i.e. the ammonia dissolved in the aprotic solvent.

The gaseous ammonia reactant is fed into the reactor at a rate sufficient to maintain the desired temperature of the reaction mixture. This ammonia feed rate may vary from about 0.1 to about 3 liters per minute per liter of the aprotic liquid/nitronium-containing compound solution, dispersion, or mixture. As will be discussed below, the total amount of ammonia used in the reaction must be sufficient to provide an excess of ammonia above the stoichiometric requirements at the end of the reaction. (at least 4 ammonia molecules for 2 nitronium ions or groups).

Preferably, the gaseous ammonia reactant is introduced into the reactor below the surface of the liquid and allowed to bubble into the liquid, or is added above the liquid and allowed to condense or be absorbed into the reaction mixture. The liquid is stirred during the ammonia addition to further facilitate dissolving of the ammonia and contact between the reactants. The ammonia may also be added from above as a liquid. When the ammonia is added to the liquid as a gas, it is preferably precooled and then fed into the reactor at a temperature just above the boiling point of ammonia, i.e., just above −33° C.

The reaction may be carried out as a batch process or on a continuous basis with batch or continuous extraction of portions of the reaction mass. When the reaction is carried out on a batch basis, it may be carried out for a period of from about 0.5 to about 8 hours, i.e., the reaction temperature is maintained, the ammonia reactant is added to the reactor, and stirring is continued for this period of time.

After this, the reaction mixture is maintained under a basic condition, for example, by adjusting the total quantity of ammonia, the stirring is continued, and the temperature of the reaction mass is allowed to rise up to room temperature, either with or without the addition of heat. The flow of ammonia into the reactor during this heating period thus may be adjusted to keep the overall reaction mixture basic, as well as to maintain a blanket of ammonia gas over the reaction mixture.

d. Reaction Equation

The reaction between ammonia and the nitronium-containing compound, when the nitronium-containing compound comprises a nitronium salt, may be represented by the following equation:

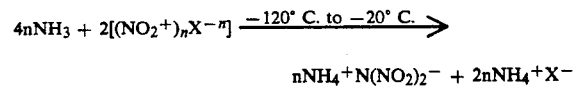

$$4n NH_3 + 2[(NO_2^+)_n X^{-n}] \xrightarrow{-120° \text{ C. to } -20° \text{ C.}}$$

$$nNH_4^+ N(NO_2)_2^- + 2nNH_4^+ X^-$$

where X is any anion capable of forming a salt with the nitronium cation, and n=1–2. As can be seen from the above reaction equation, an additional requirement for X is that it form a compound or byproduct which may be easily separated from the dinitramide salt reaction product. Excess ammonia is used to keep the reaction mass basic. Protons liberated in the nitration reaction are neutralized by the ammonia present in the reaction mixture by formation of ammonium ions.

e. Separation and Recovery of Dinitramide Salt Reaction Product

The dinitramide salt product may be extracted and separated from the byproduct by solvent extraction. Typical solvents which may be used for such solvent extraction include acetone, isopropanol, t-butanol, ethyl acetate, tetrahydrofuran, and $CH_3(CH_2)_nOH$, where n=0–7, or mixtures of the above solvents. The dinitramide salt can also be extracted by solutions of ammonia in chlorinated hydrocarbons such as $CH_3Cl_2$, $CHCl_3$, and $CCl_4$, as well as a mixture of ethyl acetate and n-butanol.

The solution containing the dinitramide salt product then is subject to a vacuum ranging from about 0.1 to 20 Torr to evaporate the solvents to obtain the desired dinitramide product.

The dried product residue may then be redissolved and recrystallized in any suitable solvent such as n-butanol or another alcohol solvent, by dissolving the residue with heating in the solvent and then cooling the solvent until the dinitramide salt precipitates. For example, when n-butanol is used as the solvent, from about 5 to about 15 milliliters of n-butanol per gram of residue is used to dissolve the residue upon heating to about 60° C. to about 80° C. after which the solution is cooled to about −15° C. and chloroform is added to precipitate the dinitramide salts as white crystals. In some instances, impurities crystallize out first and then are separated from the solution before further cooling. Other suitable solvents which can be used for recrystallization of the dinitramide salt product include $CH_3CN$, ethyl acetate, 2-6 carbon alcohols, methylethyl ketone, and nitromethane.

f. Alternate Use of Nitronium-Containing Compound as Reactant

In an alternate embodiment, instead of dissolving, dispersing, or mixing a solid nitronium-containing compound in the aprotic liquid, the ammonia gas reactant may be first dissolved up to saturation in the aprotic liquid and the ammonia-containing liquid may be slurried with the solid nitronium-containing reactant in the reactor. The amount of ammonia and solid nitronium-containing compound must, however, be regulated to assure a stoichiometric excess of ammonia in the reaction mass. Bubbling of additional ammonia gas through the reaction mass as the reaction proceeds may assure the continued presence of such a stoichiometric excess of ammonia during the reaction.

Alternatively, when the solid nitronium-containing compound has the formula $N_2O^+X^-$, the solid nitronium-containing reactant in the reactor may be contacted directly in the reactor with a gaseous reactant stream of ammonia and then mixed together in the absence of solvent in the reactor to form the desired dinitramide salt product.

g. Formation of Nitronium-Containing Compound

The reactions used to form the various nitronium-containing compounds useful as reactants in the process of the invention are well known and form no part of the invention per se. As representative examples of how to form the nitronium-containing compounds used in the practice of this invention, nitronium tetrafluoroborate may be formed by the slow addition of $BF_3$ to a solution of HF and ethyl-nitrate in methylene chloride. Nitronium nitrate may be formed by the ozonalysis of $N_2O_4$ by passing ozone through a stirred solution of $N_2O_4$ in $CH_2Cl_2$. Nitronium hydrogen disulfate may be made by adding $2SO_3$ to one equivalent of anhydrous $HNO_3$ in dry $CH_2Cl_2$.

The following examples will serve to further illustrate the process of the invention.

EXAMPLE I

The nitronium salt, nitronium tetrafluorate (free of nitrosium ion), was prepared by the slow addition of 100 grams of $BF_3$ (1.5 moles, excess) to a solution of 8.8 grams of HF (0.44 mole) and 40 grams of ethylnitrate (0.44 mole) in 300 milliliters (mls) of dry $CH_3NO_2$ kept at 10° to 15° C. by adjusting of the rate of $BF_3$ addition. After formation of the nitronium salt was complete, it was allowed to settle and the $CH_3NO_2$ was taken off. The salt was washed twice with 400 mls of a 1:1 mixture of $CH_2Cl_2$ and $CH_3NO_2$, then once with 400 mls of $CH_3Cl_2$, and finally suspended in 400 mls $CH_2Cl_2$.

The $CH_2Cl_2$ liquid containing the $NO_2BF_4$ nitronium salt was stirred and cooled to $-78°$ C. and 35 g (2.059 moles, excess) of anhydrous $NH_3$ was bubbled into the slurry over a 2 hour period. The reaction mass was stirred for 12 hrs during which time it was allowed to warm to room temperature. The product solids were allowed to settle and the $CH_2Cl_2$ was taken off by decantation. The remaining solids were then washed with 400 mls of $CH_2Cl_2$, and the mixture was then pumped down under vacuum to dryness. 150 mls of acetone was added and the solids digested for 1 hr at which time 150 mls of ethyl acetate was added to decrease the solubility of $NH_4BF_4$ and $NH_4NO_3$. The extraction solution was concentrated to dryness to give 9 grams of a pale brown solid which, when recrystallized from 70 grams of n-butanol, gave 5.5 grams of ammonium dinitramide, about a 21% yield.

EXAMPLE II $NO_2NO_3$ was made from the ozonalysis of $N_2O_4$ by dissolving 12.3 g of $N_2O_4$ (0.13 mole) in 300 mls of dry $CH_3Cl_2$ and cooled to $-78°$ C. An ozone stream was passed through the solution, while stirring, until the solution was dark blue, resulting in the formation of a solid precipitate of nitronium nitrate. Oxygen was then bubbled through the solution to remove excess $O_3$.

To the nitronium nitrate-containing liquid was added 6 grams (0.35 mole) of anhydrous $NH_3$ over a 30 minute period, while maintaining the mixture at $-78°$ C. with stirring. Stirring was further continued for 2 hrs at $-78°$ C. and then the reaction allowed to warm to room temperature. The $CH_2Cl_2$ was taken off and the remaining solids were washed with 100 mls of $CH_2Cl_2$. The ammonium dinitramide salt product was extracted twice with 50 mls of acetone, each extraction lasting 20 min. The acetone extractions were concentrated to dryness to yield 1.77 grams of a light yellow solid which was recrystallized from n-butanol to give 1.16 grams of ammonium dinitramide, about a 15% yield. The reaction between $N_2O_5$ and $NH_3$ to form ammonium dinitramide was repeated at a temperature of $-30°$ C. in $CH_2Cl_2$, resulting in a yield of about 5%; and at $-40°$ C. in a 2:$CH_3CN$:$CH_2Cl_2$ mixture, also resulting in a yield of about 5%.

EXAMPLE III

Nitronium hydrogen disulfate was made by mixing $SO_3$ and anhydrous $HNO_3$ in dry $CH_2Cl_2$ at room temperature. To 15.5 grams (0.25 mole) $HNO_3$ in 400 mls of dry stirring $CH_2Cl_2$ was added 40 grams of $SO_3$ (0.5 mole), while stirring and the mixture was allowed to reflux. After the exotherm, the resulting nitronium salt was stirred for two hours at room temperature during which time it changed from a gelatinous state to a crystalline material.

The slurry was cooled to $-78°$ C. and 30 grams of anhydrous ammonia was introduced over 2 hrs. The reaction was stirred for 12 hrs while it came to room temperature. Excess $NH_3$ was blown out with argon, 100 mls of isopropanol was added, and this mixture was stirred for 1 hr. The extraction solvents were taken off and concentrated to yield about 5 grams of solids which, when recrystallized from n-butanol, gave 2.8 grams of ammonium dinitramide, about a 20% yield. The reaction was repeated at $-30°$ C. using both crystalline and gelled forms of nitronium hydrogen disulfate. These procedures resulted in lower yields of ammonium dinitramide, about 5%. The process was also repeated using saturated $NH_3$/$CH_2Cl_2$ to extract the product, but with less efficiency than when alcohol was used.

Thus the process of the invention provides a method for forming an ionically bonded ammonium dinitramide salt [$NH_4^+N(NO_2)_2^+$] directly by reaction of ammonia with a nitronium-containing compound such as a nitronium salt at a temperature range of from about $-20°$ C.

to about −120° C., which is high enough to convert the less stable covalently bonded nitramide ($NO_2NH_2$) compound to the dinitramide salt.

Having thus described the invention what is claimed is:

1. A process for the formation of ammonium dinitramide salt which comprises reacting ammonia with a nitronium-containing compound at a temperature at which ionically bonded ammonium dinitramide salt will form.

2. The process of claim 1 wherein said reaction temperature to form said ammonium dinitramide salt ranges from about −20° C. to about −120° C.

3. The process of claim 2 wherein said reaction temperature to form said ammonium dinitramide salt ranges from about −30° C. to about −90° C.

4. The process of claim 2 wherein said reaction temperature to form said ammonium dinitramide salt ranges from about −40° C. to about −80° C.

5. The process of claim 2 wherein said nitronium-containing compound comprises a nitronium salt.

6. The process of claim 5 wherein said nitronium salt has the formula $(NO_2^+)_n X^{-n}$ where X is any anion capable of forming a salt with the nitronium cation and n=1-2.

7. The process of claim 6 wherein said anion X reacts with said ammonia and protons liberated in said reaction to form a byproduct which may be separated from said dinitramide salt reaction product.

8. The process of claim 6 wherein said anion is selected from the group consisting of $BF_4^-$, $NO_3^-$, $HS_2O_7^-$, $AlCl_4^-$, $F^-$, $PF_6^-$, $ClS_2O_6^-$, $F_2PO_2^-$, $AsF_6^-$, $SbF_6^-$, $FS_2O_6^-$, $ClO_4^-$, $S_2O_7^{-2}$, $SiF_6^{-2}$, and $SO_3F^-$.

9. The process of claim 2 wherein said nitronium-containing compound comprises a covalently bonded compound containing a $NO_2$—group.

10. The process of claim 2 wherein said process further comprises the step of forming a solution, dispersion, or mixture of said nitronium-containing compound and an aprotic liquid.

11. The process of claim 10 wherein said aprotic liquid is selected from the group consisting of diethyl ether, methylene chloride ($CH_3Cl_2$), chloroform ($CHCl_3$), carbon tetrachloride ($CCl_4$), methyl ether (($CH_3)_2O$), a freon gas, acetonitrile, ethyl acetate, sulfolane, and mixtures of same.

12. The process of claim 10 wherein the amount of nitronium-containing compound dissolved, dispersed, or mixed with said aprotic liquid comprises from about 1 to about 50 wt.% of the total weight of the resulting solution, dispersion, or mixture.

13. The process of claim 2 wherein said process is a batch process and includes the further step of permitting said reaction mass to warm up to room temperature at the end of said reaction time period.

14. The process of claim 13 wherein step of permitting said reaction mass to warm up at the end of said reaction time period further includes stirring said reaction mass while said reaction mass is warming up, and maintaining said reaction mass under a basic condition.

15. The process of claim 2 including the further step of separating said ammonium dinitramide salt product from said reaction mass.

16. The process of claim 2 wherein said ammonia is dissolved in an aprotic liquid to form a solution and said solution is mixed with a solid nitronium-containing compound during said reaction to form said ammonium dinitramide salt.

17. The process of claim 2 wherein said nitronium-containing compound is in a solid state at said reaction temperature having the formula $NO_2^+X^-$, and said nitronium-containing compound is reacted with said ammonia by contacting said solid nitronium-containing compound with ammonia gas in the absence of solvents to form said ammonium dinitramide salt.

18. The process of claim 2 wherein said process is carried out on a continuous basis.

19. The process of claim 2 wherein said process is carried out on a continuous basis by continuously contacting said nitronium-containing compound with ammonia and continuously removing said ammonium dinitramide salt product.

20. A process for the formation of ammonium dinitramide salt having the formula $NH_4^+N(NO_2)_2^-$ which comprises:
a) forming a solution, dispersion, or mixture of an aprotic liquid and a nitronium-containing compound selected from the group consisting of a covalently bonded compound containing a $NO_2$—group and a nitronium salt having the formula $(NO_2^+)_n X^{-n}$, where X is the anion of the salt and n=1-2; and
b) contacting said nitronium-containing compound with ammonia at a temperature within a range of from about −20° C. to about −120° C. to form said ammonium dinitramide salt.

21. The process of claim 20 wherein the pressure is maintained between about 700 and 800 Torr during said reaction.

22. The process of claim 20 wherein a stoichiometric excess of ammonia is used during said reaction.

23. The process of claim 20 wherein said reaction is a batch reaction carried out at said temperature for a period of from about 0.5 to about 8 hours.

24. The process of claim 20 including the further step of permitting said reaction mass to warm up to room temperature at the end of said reaction time period while stirring said reaction mass, and maintaining said reaction mass under an ammonia atmosphere.

25. The process of claim 20 including the further step of separating said ammonium dinitramide salt product from said reaction mass.

26. A process for the formation of ammonium dinitramide salt having the formula $NH_4^+N(NO_2)_2^-$ which comprises:
a) forming a solution, dispersion, or mixture of an aprotic liquid and a nitronium-containing compound selected from the group consisting of a covalently bonded compound containing a $NO_2$—group and a nitronium salt having the formula $(NO_2^+)_n X^{-n}$, where X is the anion of the salt and n=1-2; and
b) contacting said nitronium-containing compound with a stoichiometric excess of ammonia at a temperature within a range of from about −20° C. to about −120° C., while maintaining the pressure within a range of between about 700 and 800 Torr for a period of from about 0.5 to about 8 hours;
c) permitting said reaction mass to warm up to room temperature at the end of said reaction time period while stirring said reaction mass, and maintaining said reaction mass under an ammonia atmosphere; and
d) separating said ammonium dinitramide salt product from said reaction mass.

* * * * *